Oct. 27, 1953
T. MEIER
2,656,819
WIND CONTROLLED FEED TROUGH
Filed Aug. 13, 1951
2 Sheets-Sheet 1
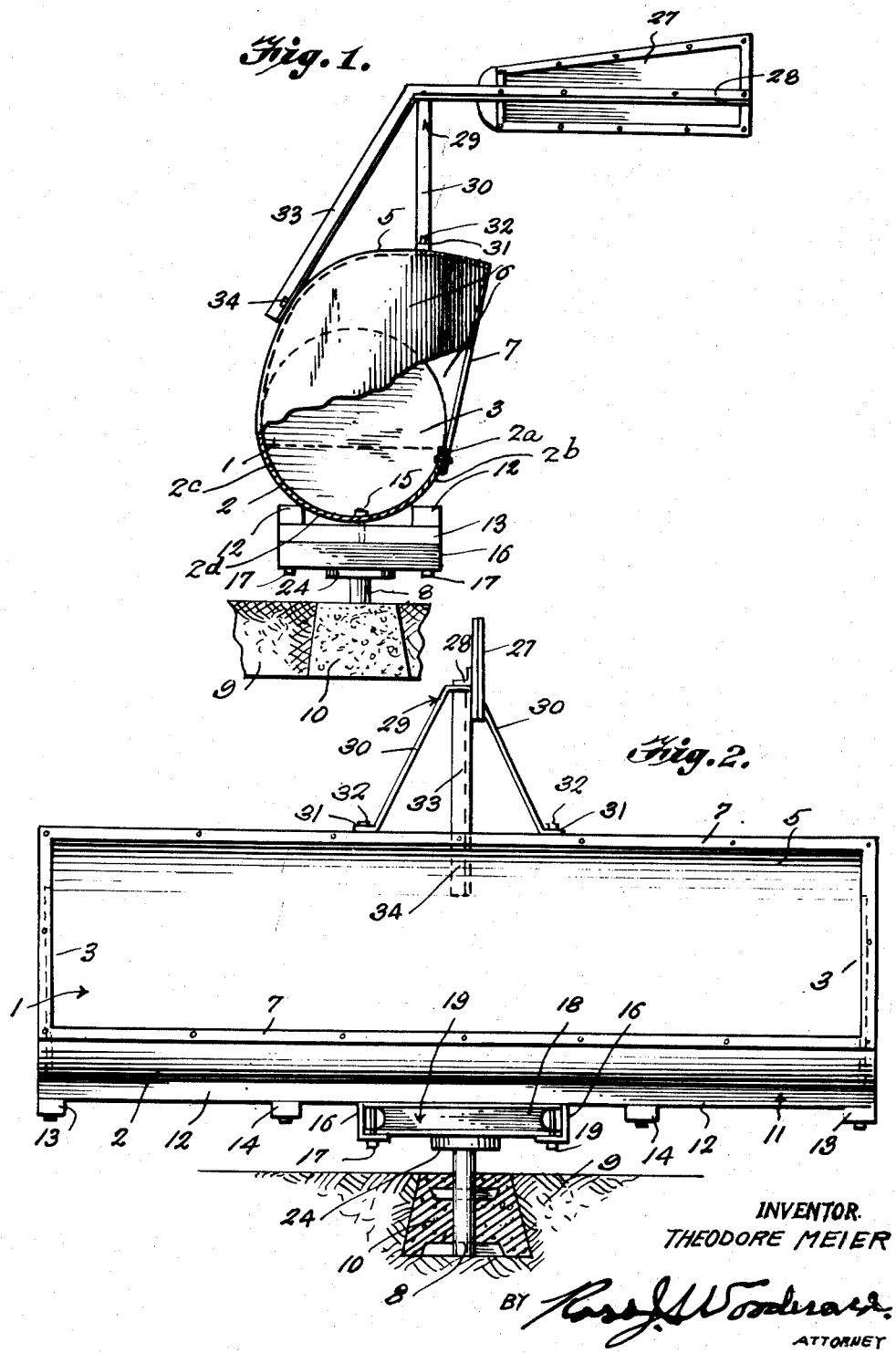
INVENTOR.
THEODORE MEIER
BY
ATTORNEY Oct. 27, 1953        T. MEIER        2,656,819
WIND CONTROLLED FEED TROUGH
Filed Aug. 13, 1951        2 Sheets-Sheet 2
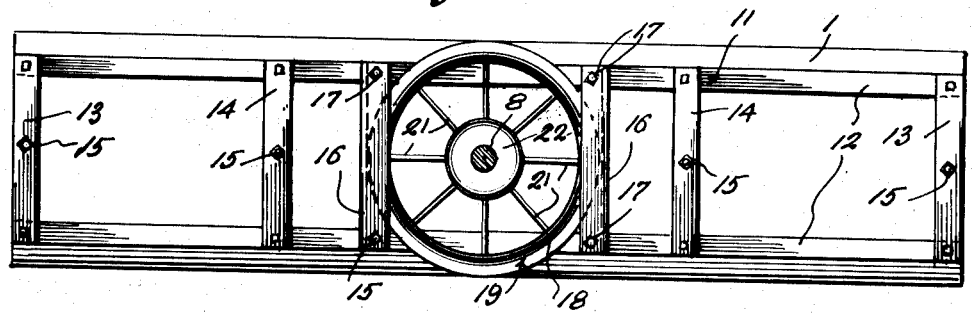
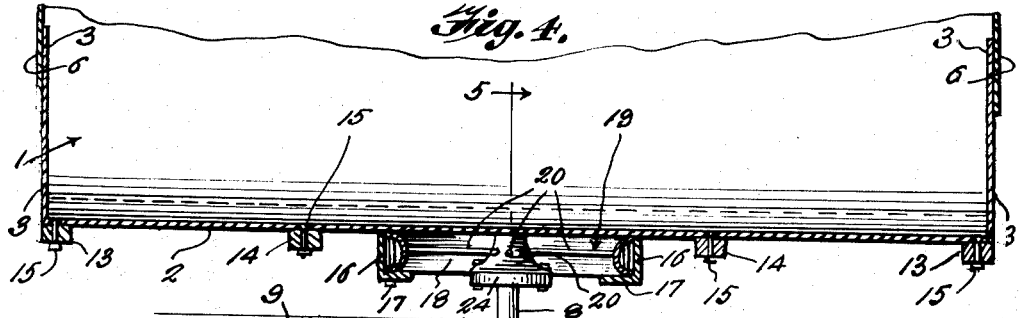
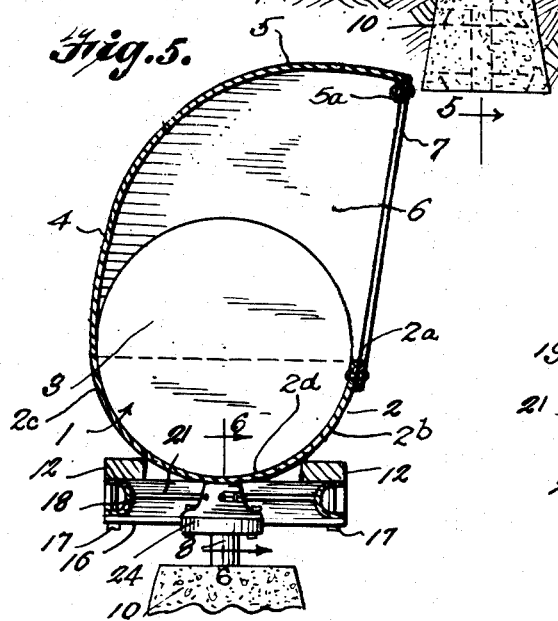
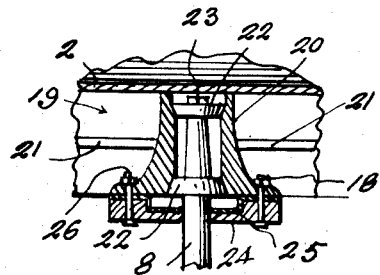
INVENTOR.
THEODORE MEIER
ATTORNEY Patented Oct. 27, 1953

2,656,819

UNITED STATES PATENT OFFICE 2,656,819

WIND CONTROLLED FEED TROUGH

Theodore Meier, Darrouzett, Tex.

Application August 13, 1951, Serial No. 241,614

4 Claims. (Cl. 119—51)

1

This invention relates to a feed trough in which grain, salt, water, or the like may be placed for consumption by animals. If such material is placed in an open trough placed in a field or barnyard wind is liable to blow dirt into the trough and contaminate the feed or water with which the trough is filled and if rain is blown into a trough containing certain kinds of feed it is liable to spoil the food before it can be consumed by the animals for which it is intended. This objection may be overcome by providing a trough with a shield which serves very effectively to exclude rain or snow from the trough without interfering with animals feeding from the trough and by so mounting the trough that it may turn about a vertical axis and thus cause the trough and its shield to be so disposed relative to the direction in which wind is blowing that the shield will very effectively prevent rain from entering the trough and also prevent wind from blowing feed out of the trough.

It is therefore one object of the invention to provide a trough having a support which is of an improved construction and mounts the trough for turning movement about a vertical spindle, the shield for the trough being of such formation that while it will prevent rain from entering the trough and feed being blown out of the trough the force of wind striking the trough and its shield will not be liable to upset the trough and its support.

Another object of the invention is to provide a rotatably mounted trough wherein the shield for the trough carries a vane mounted over the shield in an improved manner and so disposed that wind striking the vane will cause the trough to be turned about its spindle and an open side of the shield presented in a direction towards which the wind is blowing. It will thus be seen that while animals may freely feed from the trough through the open side of the shield the closed side of the shield against which the wind blows will very effectively prevent rain from entering the trough or feed being blown out of the trough.

Another object of the invention is to provide a shielded trough having means for rotatably mounting it of such construction that bearings will be shielded from dust and thus prevented from becoming clogged and the trough allowed to turn freely about its pivotal mounting.

Another object of the invention is to provide a rotatable trough which is of sturdy construction and will not readily become damaged and rendered inoperative when in use.

2

Another object of the invention is to provide an improved trough of such formation that it may be formed of empty oil drums, or the like, and thus manufactured at low cost.

The invention is illustrated in the accompanying drawings wherein:

Figure 1 is a view showing the improved trough principally in end elevation and partially in vertical section.

Figure 2 is a front view of the improved trough.

Figure 3 is a view looking at the bottom of the trough.

Figure 4 is a fragmentary sectional view taken longitudinally through the trough and its support upon the line 4—4 of Figure 1.

Figure 5 is a vertical sectional view taken transversely through the trough taken along the line 5—5 of Figure 4.

Figure 6 is a fragmentary sectional view upon an enlarged scale taken vertically through the rotary mounting for the trough, the view being upon the line 6—6 of Figure 5.

This improved trough is particularly intended for feeding cattle, hogs, and other animals, but it will be understood that it may be used for supplying feed, water, and the like or to other animals or poultry such as chickens, turkeys, or other fowls. The dimensions of the trough will be in accordance with the use to which it is to be put and the quantity it is intended to hold.

This trough 1 has an elongated body which is preferably formed from an empty oil drum or similar discarded cylindrical container. The annular wall of the drum is slit longitudinally for its full length and at its ends the wall is severed or otherwise detached from heads of the container for approximately half its circumference. Therefore the trough has a body 2 which is of concavo-convexed formation in cross section and end walls or heads 3 which are circular and project upwardly beyond the front edge 2ª of the body 2. Since the body is arcuate in cross section it has front and rear side wall portions 2ᵇ and 2ᶜ which merge into a bottom 2ᵈ for the body. The portion 4 of the annular wall of the container which is severed from the heads is bent upwardly and forms a hood or shield 5 which is integral with the rear side wall portion 2ᶜ of the body and extends forwardly over the body and has its front edge 5ª spaced upwardly from the edge 2ª of the body. This provides the trough with a front opening extending the full length of the body. Plates 6 forming end shields or continuations of the end walls 3 are secured flat against outer surfaces of the end walls and project upwardly therefrom with their marginal edges firmly secured to the hood along opposite ends thereof. A metal frame 7 formed as a unit or from metal strips is mounted along margins of the front opening of the trough as a border and serves as a reinforcement and also to prevent animals from being cut by contact with edges of the hood and the end plates or the front edge of the body portion of the trough. Therefore animals may drink or feed from the trough without danger of being accidentally cut along the head or neck.

This trough is to be rotatably mounted for turning about a vertical axis and in order to do so there has been provided a standard or shaft 8 which is mounted upright in the ground and embedded in a block or concrete 10 moulded about the lower portion of the shaft and buried in a hold formed in the ground. A cradle 11 is mounted under the bottom of the trough and has side bars 12 and end bars 13 and cross bars 14, the trough being firmly secured upon the cradle by fasteners 15 which may be rivets or equivalent fasteners. Strips of channel metal 16 are secured to the side bars 12 transversely of the cradle and these strips engage under the rim 18 of a bearing member or turn table 19. The bearing member has a vertically disposed hub 20 connected with the rim by spokes 21. The upper portion of the shaft 8 passes upwardly through the bore of the hub and through bearings 22 and is held in place by a nut 23. The trough and its cradle may therefore turn freely about the shaft or standard. A plate or metal disc 24 having a thickened marginal portion or upstanding flange 25 is secured to the bottom of the hub by bolts 26 and serves as a dust shield which very effectively prevents dust and other dirt from entering the bore of the hub and clogging the bearings 22.

The trough must be held in a position preventing its open front away from the direction which wind is blowing. In order to do so there has been provided a vane 27 which is formed of stiff material such as sheet metal. This vane is secured against an arm 28 which is formed of angle metal and extends horizontally with its inner end portion rigidly secured upon the upper end of a yoke 29. The yoke is also formed of stiff metal and consists of a metal strip bent to form a yoke of inverted V-shape. Arms 30 of the yoke diverge downwardly and terminate in feet 31 through which fasteners such as the rivets 32 are passed and secure the feet to the hood 5 close to the front edge thereof. The yoke must be braced so that it will be maintained in an upright position and in order to do so the metal strip from which the arm 28 is formed of such length that its rear end portion may be bent downwardly at an incline and form a brace 33 which has its lower end firmly secured to the hood by a rivet 34. When wind is blowing it strikes the vane 27 and causes the trough to be turned about the shaft or standard 8 until the open side of the trough faces away from the direction from which the wind is blowing. Rain or snow will thus be prevented from being blown into the trough through its open front side and feed, salt, or the like will not be damaged. The feed will not be damaged by the rain and animals will not be caused to become sick by eating moldy food. In addition the wind will be prevented from blowing feed out of the trough and the feed will not be wasted by being strewn upon the ground about the trough and trampled into the ground.

Having thus described the invention, what is claimed is:

1. A feed trough comprising an elongated body having an annular wall and heads at its ends, the annular wall being detached from the heads about the upper portion of the circumference thereof and extending upwardly and thereby providing a trough shaped body having a bottom and front and rear side wall portions, the detached portion of said annular wall extending upwardly and forwardly over said body and constituting a hood integral with the rear side wall and having its front edge spaced upwardly from the front wall of the body, plates rigidly mounted against outer surfaces of said heads and extending upwardly therefrom and secured along their margins to end edge portions of said hood and constituting reinforcements for the heads and supports for the hood, a cradle mounting said body for turning movement about a vertical axis, and a vane mounted over the hood.

2. A feed trough comprising an elongated trough-shaped body having a bottom and front and rear side wall portions and end walls at its ends, a hood extending upwardly and forwardly from the rear wall portion and having its front edge spaced upwardly from the upper edge of the front wall portion and thereby providing the trough with an open front side, a cradle upon which said body is mounted, a vertically disposed hub under said cradle, a rim surrounding said hub and connected therewith by spokes, said rim being supported horizontally under said cradle midway the length thereof, a vertical shaft passing upwardly through the hub and mounting the cradle and said body for turning movement about a vertical axis, and a vane mounted over said hood midway the length thereof and extending forwardly from the hood.

3. A feed trough comprising an elongated trough-shaped body having a bottom and front and rear side wall portions and end walls, a hood extending upwardly and forwardly over the body from the rear side wall portion thereof, a cradle under said body, transverse bars mounted across said cradle in depending relation thereto and having inwardly extending horizontal flanges along their lower edges, a vertical hub, a rim about said hub rigidly connected therewith in concentric relation thereto and clamped between the cradle and the flanges of said bars and supporting the hub midway the length and width of the cradle and the body, bearings in said hub, a vertical spindle having its upper portion passing through said hub and its bearings and mounting the body for turning movement about the spindle, a plate detachably secured to the lower end of said hub and fitting about said spindle and serving as a dust cap for the lower end of the hub, and a vane mounted over said hood and serving to turn the trough about said spindle to a position disposing its front side away from the direction in which wind is blowing.

4. A feed trough comprising an elongated trough-shaped body open along its top and having a bottom and front and rear side wall portions and end walls at its ends, said end walls being rigid with the bottom and the side walls and having portions extending upwardly above the body, a hood extending upwardly from the rear side wall of said body and forwardly over the body with its front edge spaced upwardly from the front wall thereof and defining a front opening for the trough, plates rigidly mounted against outer surfaces of said end walls and to marginal edges of the hood, a frame for the front opening secured along front edges of the plates and the hood and the front wall of the body and reinforcing the same, a support pivotally mounting said body for turning about a vertical axis, and a vane mounted over said hood and extending in a direction forwardly of the trough.

THEODORE MEIER.

References Cited in the file of this patent

UNITED STATES PATENTS

| Number | Name | Date |
|---|---|---|
| 733,448 | Williams | July 14, 1903 |
| 958,558 | Stiggleman | May 17, 1910 |
| 1,545,007 | Milliken | July 7, 1925 |
| 1,796,466 | Lage | Mar. 17, 1931 |
| 2,524,502 | Wilkinson | Oct. 3, 1950 |